(12) United States Patent
DeDecker et al.

(10) Patent No.: US 12,691,391 B2
(45) Date of Patent: Jul. 28, 2026

(54) EXTRACTION OF GUAYULE RESIN

(71) Applicant: Bridgestone Corporation, Chuo-ku (JP)

(72) Inventors: Mark N. DeDecker, North Canton, OH (US); Christian Andrews, Kent, OH (US)

(73) Assignee: Bridgestone Corporation, Chuo-ku (JP)

( * ) Notice: Subject to any disclaimer, the term of this patent is extended or adjusted under 35 U.S.C. 154(b) by 331 days.

(21) Appl. No.: 18/258,476

(22) PCT Filed: Dec. 16, 2021

(86) PCT No.: PCT/US2021/072970
§ 371 (c)(1),
(2) Date: Jun. 20, 2023

(87) PCT Pub. No.: WO2022/133476
PCT Pub. Date: Jun. 23, 2022

(65) Prior Publication Data
US 2024/0042347 A1 Feb. 8, 2024

Related U.S. Application Data

(60) Provisional application No. 63/126,773, filed on Dec. 17, 2020.

(51) Int. Cl.
*C08C 2/02* (2006.01)
*B01D 11/04* (2006.01)
(Continued)

(52) U.S. Cl.
CPC ........ *B01D 11/0492* (2013.01); *B01D 21/262* (2013.01); *C08C 2/02* (2013.01); *B01D 2011/002* (2013.01)

(58) Field of Classification Search
CPC .......... B01D 11/0492; B01D 2011/002; B01D 9/0054; B01D 11/0284; B01D 11/0288;
(Continued)

(56) References Cited

U.S. PATENT DOCUMENTS

| | | | | |
|---|---|---|---|---|
| 957,495 | A | * 5/1910 | Chute | C08G 65/46 528/496 |
| 4,530,995 | A | * 7/1985 | Gutierrez | A01N 3/00 524/255 |

(Continued)

FOREIGN PATENT DOCUMENTS

| | | |
|---|---|---|
| EP | 0276841 A2 | 8/1988 |
| EP | 3209700 B1 | 12/2018 |

(Continued)

OTHER PUBLICATIONS

Michael E. Salvucci et al, "Improved methods for extraction and quantification of resin and rubber from guayule", Industrial Crops and Products, vol. 30, 2009, pp. 9-16 (Year: 2009).*

*Primary Examiner* — Joseph W Drodge
(74) *Attorney, Agent, or Firm* — Meredith E. Hooker; Nathan T. Lewis

(57) ABSTRACT

In various embodiments, methods for extracting various constituents from *Parthenium argentatum* resin are disclosed. The methods begin with a nonpolar resin solution that is manipulated by polar solvent and water additions to precipitate low MW isoprene rubber and form separable aqueous polar and nonpolar liquid fractions, wherein the aqueous polar liquid fraction is rich in argentatins and the nonpolar liquid fraction is rich in guayulins. In other variations, an aqueous polar solvent is added to the nonpolar resin solution to directly produce a two-phase system. The extraction methods can be fully automated by using a continuous countercurrent liquid/liquid extractor.

30 Claims, 7 Drawing Sheets

(51) Int. Cl.
  *B01D 21/26* (2006.01)
  *B01D 11/00* (2006.01)

(58) Field of Classification Search
  CPC .............. B01D 11/0292; B01D 11/048; B01D
      11/0488; B01D 17/0208; B01D 17/0217;
      B01D 21/262; B01D 37/00; C08L 97/02;
      C08L 2666/02; C08L 2666/26; C08L
      2666/68; C08C 1/04; C08C 2/06; C08C
      2/02; C08C 3/02; C08C 4/00; C08H 8/00;
                    C08H 99/00; C09F 1/02
  See application file for complete search history.

(56)                References Cited

U.S. PATENT DOCUMENTS 4,591,631  A      5/1986  Beattie
4,739,038  A      4/1988  Schloman, Jr.

5,321,111  A  *   6/1994  Ji ............................... C08C 4/00
                                                        528/930
8,815,965  B2     8/2014  Cole
9,611,363  B2     4/2017  Swiger
10,245,526  B2    4/2019  White
2006/0106183  A1   5/2006  Cornish
2014/0336288  A1  11/2014  Cole
2016/0229926  A1*  8/2016  Huang ................... C08L 97/02
2017/0218094  A1   8/2017  Battistel
2018/0171178  A1   6/2018  Querci
2018/0371111  A1  12/2018  Querci
2024/0101722  A1*  3/2024  Huang ................... C08C 2/06

FOREIGN PATENT DOCUMENTS

EP          3328874  B1    11/2019
JP          S5758831  A     4/1982
JP          2018522890  A    8/2018

* cited by examiner

200

Second separation 180 mL of resin solution

EXTRACTION OF GUAYULE RESIN

This application is a national stage application of PCT/US2021/072970 filed Dec. 16, 2021, which claims the benefit of U.S. Provisional Application Ser. No. 63/126,773 filed Dec. 17, 2020, all of which are incorporated herein by reference in their entirety.

FIELD

The present disclosure generally relates to natural products separations, and in particular to methods for extracting constituents found in guayule resin.

BACKGROUND

Guayule resin is a product generated from the processing of guayule (*Parthenium argentatum*) shrubs for natural polyisoprene rubber. Guayule resin may be obtained in acetone during a process of deresinating guayule rubber, or the resin can be directly extracted from ground shrub material using acetone in a Soxhlet extraction. Rather than separate and extensively purify the guayule resin, this low cost, tacky gum may be minimally processed to produce a wood preservative or an adhesive. Some of the natural products comprising guayule resins may be of commercial interest if a cost-effective technique for separating them from the complex resin mixture was available.

Guayule resin includes many isoprenic compounds including terpenes, sesquiterpenes, terpenoids, sesquiterpenoids and triterpenes. Of commercial interest are, for example, guayulin A and guayulin B, both sesquiterpene esters finding use in fragrances and insect pheromone production, and argentatin A, B, C and D, each tetracyclic-type triterpenes with potential antioxidant and antitumor activity. In particular, the argentatins can be converted into various compounds showing promise as pharmaceutical actives. See, for example, G. Flores-Rosete, et al., "Anti-inflammatory and Cytotoxic Cycloartanes from Guayule (*Parthenium argentatum*)," *Natural Products Communications,* 2008, 3(3), 413-422. This article details the chemical structures of each of the naturally occurring argentatins found in guayule.

Complicating separation of these potentially valuable isoprenic compounds is that a complex mixture of unrelated materials are also in the resin along with the isoprenic substances, including fatty acid triglycerides, waxes, low molecular weight (MW) isoprene rubber, carotenoids, and residual lignocellulosic substances.

Therefore, what is still needed are efficient and cost effective methods to extract these potentially high value natural products from guayule resin.

SUMMARY

It has now been discovered that by beginning with a nonpolar guayule resin solution, such as a solution comprising guayule resin dissolved in toluene or other nonpolar solvent or mixture of solvents, a sequence of solvent manipulations results in a straightforward separation of solid and liquid fractions, each rich in a particular resin constituent or group of resin constituents.

In accordance with various embodiments of the present disclosure, methods for extracting guayule resin are described. The methods comprise solvent polarity changes, filtrations and phase separations to obtain resin fractions rich in a particular resin constituent or group of resin constituents.

In various embodiments, extraction methods provide lignocellulosic substances, low MW isoprene rubber, argentatins and guayulins beginning with a nonpolar guayule resin solution.

In various embodiments, the extraction methods herein are amenable to automation in continuous countercurrent extractor-centrifuge machinery.

BRIEF DESCRIPTION OF THE DRAWING FIGURES

The subject matter is pointed out with particularity and claimed distinctly in the concluding portion of the specification. A more complete understanding, however, may best be obtained by referring to the detailed description and claims when considered in connection with the following drawing figures:

DETAILED DESCRIPTION

Figure 1:
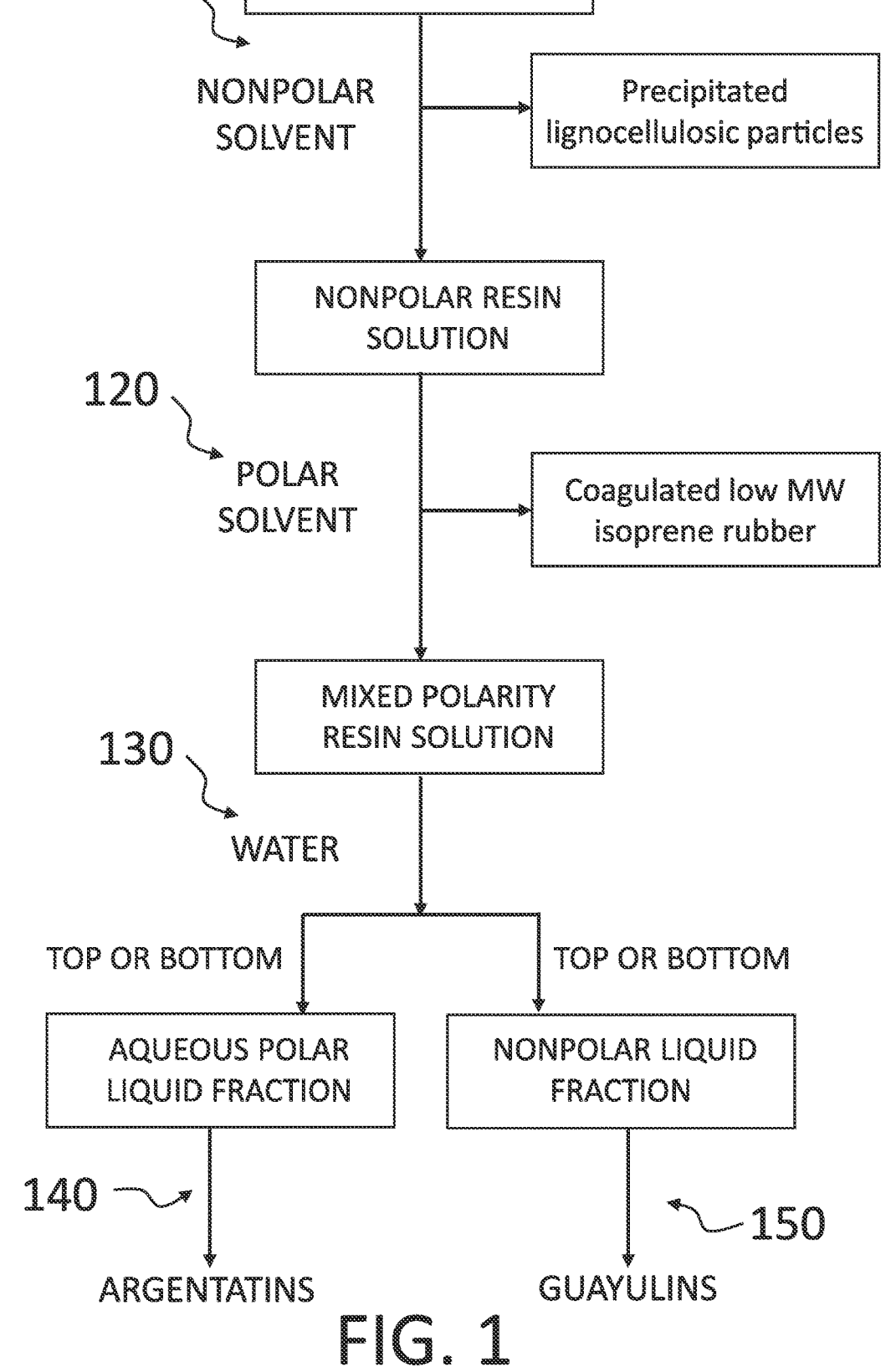
FIG. 1 illustrates a method for guayule resin extraction resulting in isolation of lignocellulosic solids, coagulated low MW isoprene solids, argentatins and guayulins, beginning with a resin solution in a nonpolar solvent.

The detailed description of exemplary embodiments makes reference to the accompanying drawings, which show exemplary embodiments by way of illustration and their best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In accordance with various embodiments of the present disclosure, methods for extracting guayule resin are described. The methods comprise solvent polarity changes and phase separations leveraged to obtain resin fractions rich in a particular resin constituent or a group of resin constituents. The methods are readily adaptable to automation in continuous countercurrent extractor-centrifuge machinery.

Definitions and Interpretations

As used herein, the plural "s," when used in conjunction with a hydrocarbon, e.g., pentanes or hexanes, infers a mixture of isomers of the hydrocarbon, recognizing that some technical grades of low boiling hydrocarbons are mixtures of isomers. Thus, for example, the term "pentanes" indicates a mixture of hydrocarbons comprising n-pentane, iso-pentane and neo-pentane, and the term "hexanes" indicates a mixture of hydrocarbons generally comprising n-hexane, iso-hexane, 3-methylpentane, 2,3-dimethylbutane, and neo-hexane. When used, a singular recitation of a hydrocarbon, such as cyclohexane, refers to at least technical grade solvent that is >95.5% cyclohexane, or reagent grade solvent that is >99% cyclohexane, rather than a mixture of isomers.

As used herein, the term "aromatic hydrocarbon" takes on its ordinary meaning in chemistry, and primarily relates to low boiling liquid solvents such as benzene, toluene, o-xylene, m-xylene, p-xylene, ethylbenzene, 1,2,3-trimethylbenzene, 1,2,4-trimethylbenzene, mesitylene, 2-ethyltoluene, 3-ethyltoluene, and 4-ethyltoluene, and so forth.

As used herein, the term "petroleum ether" takes on its ordinary meaning in chemistry and refers to a mixture of low boiling aliphatic hydrocarbons.

The term "polar" as used herein in reference to solvents takes on its ordinary meaning in chemistry to indicate solvents having partial charges or a dipole moment. Besides water, classical examples of polar solvents include alcohols and ketones.

The term "nonpolar" as used herein in reference to solvents takes on its ordinary meaning in chemistry to indicate solvents having no partial charges or dipole moment.

Classical examples of nonpolar solvents in chemistry include the hydrocarbons like pentanes, hexanes, cyclohexane, and aromatic solvents such as benzene and toluene.

General Embodiments

1. Extraction Method 100

In embodiments of a first method, a combination of a nonpolar solvent, a polar solvent, and water is used to separate guayule resin into commercially viable product streams further comprising lignocellulosic substances, low MW isoprene rubber, various argentatins, and various guayulins.

With reference now to FIG. 1, step 110 of extraction method 100 comprises dissolving guayule resin in a nonpolar solvent to obtain a nonpolar resin solution and a first precipitate. Prior to dissolution in the nonpolar solvent, the resin may begin substantially free of any solvent, and may comprise the product recovered from deresination of isoprene rubber obtained from guayule shrubs.

In various embodiments, the ratio of guayule resin to nonpolar solvent depends on the nature of the nonpolar solvent and its ability to selectively dissolve some resin constituents and not others.

In various embodiments, the w/w ratio of guayule resin to nonpolar solvent in the preparation of the nonpolar resin solution is from about 1:1 resin to nonpolar solvent to about 1:2 resin to nonpolar solvent. That is, on a weight basis, 100 parts guayule resin is dissolved in about 100-200 parts nonpolar solvent. This dissolution step may further comprise external heating to accelerate the process, such as heating from above ambient up to a temperature below the boiling point of the nonpolar solvent. In various embodiments, external heating to form the nonpolar resin solution may be from about just above ambient up to a maximum of about 100° C. and below the boiling point of the nonpolar solvent. In a more specific example, if the nonpolar solvent used in this dissolution step comprises toluene, (BP=111° C., at atmospheric pressure), the toluene may be heated up to about 50° C. to accelerate the dissolution of the guayule resin in the toluene to form the nonpolar resin solution.

In various embodiments, the nonpolar solvent is selected from the group consisting of $C_3$-$C_7$ aliphatic hydrocarbons, aromatic hydrocarbons, and mixtures thereof. In various embodiments, the nonpolar solvent is selected from the group consisting of hexanes, pentanes, petroleum ether, toluene, cyclohexane, and mixtures thereof. In various embodiments, the nonpolar solvent is selected from the group consisting of toluene, cyclohexane, or mixtures thereof. In various examples, the nonpolar solvent comprises toluene. In various embodiments, the nonpolar solvent comprises cyclohexane. Although various embodiments and examples are illustrated with use of one nonpolar solvent, e.g., toluene, the scope of the methods in accordance with the present disclosure includes use of "at least one nonpolar solvent," and refinement of the processes herein, including automation, may require mixtures of nonpolar solvents for the formation of the initial nonpolar resin solution.

The nonpolar resin solution obtained in step 110 of extraction method 100 results in a first precipitate that can be removed by any combination of decantation, gravity filtration, vacuum filtration, centrifugation or other methods, with centrifugation, for example, conducted in batches or in a suitably configured continuous extractor-centrifuge machine. Centrifugation facilitates separation of colloidal material that might otherwise clog filter papers or filtration media. The first precipitate thus obtained as a solid mass, or combined batches of solids, can be rinsed with appropriate solvents to remove residual resin components. These filtrates from additional washings of the first precipitate can be combined with the nonpolar resin solution without precipitates for use in the next step in the method.

In various embodiments, the first precipitate from the nonpolar resin solution comprises lignocellulosic substances in the form of solid particles. The lignocellulosic substances thus obtained constitute a first possible commercial product stream.

The nonpolar resin solution resulting from step 110 (with solvent aliquots from washing the first precipitate optionally added in) comprises a low viscosity fluid carrying all of the other remaining constituents of the resin in the nonpolar solvent.

With continued reference to FIG. 1, step 120 of extraction method 100 comprises mixing a polar solvent with the nonpolar resin solution to produce a mixed polarity resin solution. The w/w ratio of nonpolar resin solution to polar solvent is from about 1:0.5 to about 1:2. That is, the polar solvent is added at about 50-200 parts per 100 parts by weight nonpolar resin solution.

In various embodiments, the polar solvent is selected from the group consisting of low molecular weight alcohols, acetone, and mixtures thereof. In various embodiments, the polar solvent is selected from the group consisting of methanol, ethanol, isopropanol, acetone, and mixtures thereof. In various embodiments, the polar solvent is methanol.

Step 120 of extraction method 100 produces a second precipitate in the form of coagulated solids comprising low molecular weight (MW) isoprene rubber. The rubber coagulant can be removed by any combination of decantation, gravity filtration, vacuum filtration and centrifugation, with the centrifugation, for example, conducted in batches or in continuous extractor-centrifuge machinery. Centrifugation facilitates separation of colloidal material that might otherwise clog filter papers or filtration media. The rubber can be rinsed with additional aliquots of the polar solvent to remove residual resin components, and these washing can be combined into the resulting mixed polarity resin solution. The low 1\4W isoprene rubber constitutes a second possible commercial product stream.

With continued reference to FIG. 1, step 130 of extraction method 100 comprises addition of water to the mixed polarity resin solution to form a two-phase system comprising an aqueous polar phase and a nonpolar phase. Depending on the w/w ratio of water to the mixed polarity resin solution, the aqueous polar solvent phase can be either the top layer or the bottom layer in this two-phase system, as illustrated in FIG. 1. Step 130 further comprises the separation of the aqueous polar liquid fraction from the nonpolar liquid fraction in this two-phase system.

In various embodiments, the w/w ratio of water to mixed polarity resin solution is expressed as the w/w ratio of the water to the polar solvent used in step 120 above. In various embodiments, the w/w ratio of water to the polar solvent is from about 1:20 to about 1:2. Stated another way, the amount of water added is from about 5 parts water/100 parts of polar solvent to about 50 parts of water/100 parts polar solvent. In various embodiments, it is preferable to use a w/w ratio of from about 1:20 to about 1:5, (between 5 and 20 parts of water/100 parts of polar solvent) so that the top layer will be the aqueous polar liquid fraction comprising the polar solvent and the water with the polar resin components and the bottom layer will be the nonpolar liquid fraction.

In step 130, any remaining isoprene rubber not previously precipitated out in step 110 will be found in the nonpolar liquid fraction layer also comprising the nonpolar solvent used in step 110. Optionally, the separated aqueous polar liquid fraction can be extracted with additional aliquots of nonpolar solvent, such as a $C_3$-$C_7$ hydrocarbon like pentane or hexane, which can be discarded. These extractions can reduce the color of the aqueous polar liquid fractions.

With continued reference to FIG. 1, steps 140 and 150 each comprise desolventization processes. Desolventization comprises evaporation of volatiles to leave behind solid residues, and may comprise any combination of heat (or ambient temperature) and vacuum. In various embodiments, desolventization steps 140 and 150 comprise removal of all volatiles in vacuo. Certainly, these two desolventization steps can be performed in either order or there is the option that one of the layers may be discarded if the substances in that particular layer are not desired for some reason.

In step 140, the aqueous polar liquid fraction is desolventized to recover a first solids mixture rich in argentatins, having a melting point of about 50° C. These solids are substantially free of low MW isoprene rubber. The mixture of argentatins constitutes a third possible commercial product stream. Individual argentatins in this mixture of argentatins may be isolated and purified by chromatographic methods.

In step 150, the nonpolar liquid fraction can be desolventized to obtain a second solids mixture rich in guayulins. The mixture of guayulins constitutes a fourth possible commercial product stream. Individual guayulins present in this mixture of guayulins may be isolated and purified by chromatographic methods.

Optionally, the nonpolar liquid fraction can be extracted one or more times with aliquots of an aqueous polar solvent, e.g., a mixture of water and the polar solvent used in step 120, to recover more argentatin rich solids.

Countercurrent Liquid/Liquid Extraction

The above steps 120 and 130 can be fully automated by using a continuous liquid/liquid countercurrent extractor. In various embodiments, continuous liquid/liquid countercurrent extraction is accomplished by using a suitable extractor-centrifuge. The method 100, except for the initial resin dissolution step 110 and the two desolventization steps 140 and 150, can comprise an automated process by passing the nonpolar resin solution stream countercurrent to an aqueous polar solvent stream in a manner such that the aqueous product stream removes the argentatins from the nonpolar resin solution, leaving the nonpolar resin solution stream rich in guayulins. In the automated process, low MW isoprene rubber particles are precipitated during the continual mixing of the countercurrent streams, and in an extractor-centrifuge, can be continually centrifuged off into collector screens.

In variations of an automated method, countercurrent liquid/liquid extraction may be continuous or semi-continuous. In the semi-continuous version, a series of mixing/settling tanks can be used for the step that precipitates out the low MW isoprene rubber particles.

In various embodiments of an automated countercurrent process, the polar solvent stream comprises a composition that is changed compositionally over time. For example, the polar solvent countercurrent stream may begin as an anhydrous polar solvent, such as the polar solvent chosen for step 120 in method 100 (e.g., methanol). Beginning the automated process in this way, the precipitated low MW rubber particles can be continually centrifuged out prior to changing the composition of the polar solvent stream. As the process continues, and perhaps signaled by a cessation of the rubber particle precipitate, water can be fed into the countercurrent polar solvent stream such that the stream because more aqueous over time. The countercurrent streams in the meantime become richer in the compounds more soluble in each stream. That is, the aqueous polar stream becomes richer in argentatins while the nonpolar solvent stream becomes richer in guayulins like the single step 130 in method 100.

In other embodiments, a constant aqueous polar solvent composition is used as the countercurrent stream against the nonpolar resin solution stream. This composition can be the combination of the water and the polar solvent from the method 100, and in some instances, at the same w/w ratio of water/polar solvent used in the illustrated method. So, for example, the countercurrent polar stream may comprise a mixture of 1:20 to about 1:2 water/polar solvent on a weight basis. In certain embodiments, the countercurrent polar stream may comprise a w/w ratio of water/polar solvent of 1:20 to about 1:5. In various embodiments, the two countercurrent running streams comprise the nonpolar resin solution stream and an aqueous methanol stream.

An exemplary extractor-centrifuge for use herein is the Podbielniak extractor centrifuge. This type of extractor supplies centrifugal force to improve the separation efficiency of both liquid/liquid phases and solid-liquid phases. The Podbielniak extractor centrifuge is available from Siebtechnik Tema, Inc., Cincinnati, Ohio, USA.

2. Extraction Method 200

In a second method, a combination of a nonpolar solvent and an aqueous polar solvent is used to separate commercially viable product streams that include lignocellulosic substances, low MW isoprene rubber, various argentatins, and various guayulins. In various embodiments, extraction method 200 is a more streamlined and simpler version of extraction method 100, detailed above, wherein the low MW isoprene rubber ends up in a liquid phase rather than as coagulated particles that can be centrifuged out.

Figure 2:
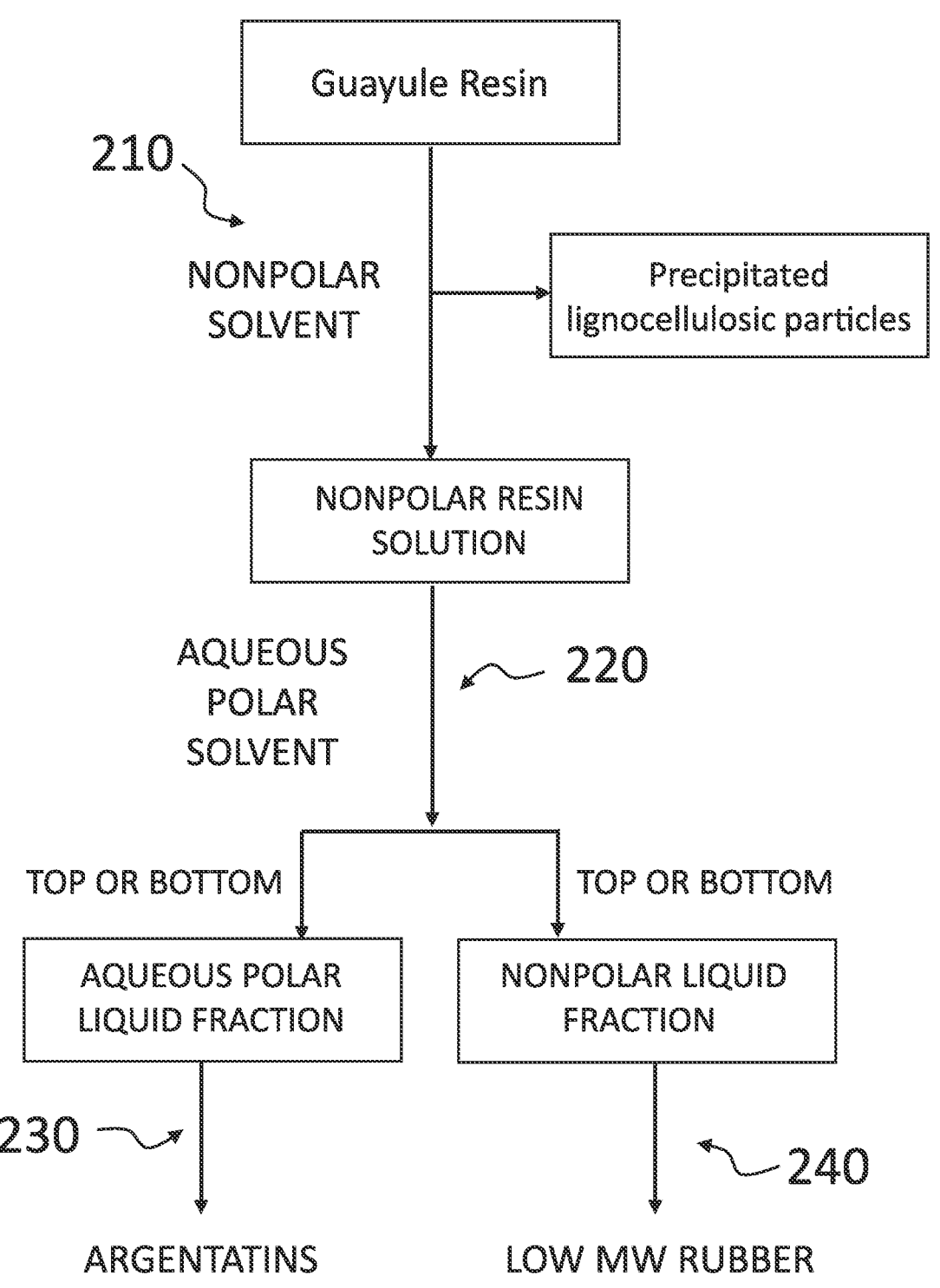
FIG. 2 illustrates a method for guayule resin extraction resulting in isolation of lignocellulosic solids, argentatins and guayulins, beginning with a resin solution in a nonpolar solvent.

With reference now to FIG. 2, step 210 of extraction method 200 is identical to step 110 of extraction method 100 (FIG. 1), and comprises dissolving guayule resin in a nonpolar solvent such as toluene and/or cyclohexane to obtain a nonpolar resin solution and a precipitate comprising lignocellulosic particles. For the sake of brevity, the details may be referred to above and are not repeated here.

With continued reference to FIG. 2, step 220 of extraction method 200 comprises extracting the nonpolar resin solution with an aqueous polar solvent mixture to extract the polar components of the resin. Extraction method 200 differs from extraction method 100 at this stage in that an aqueous polar solvent is mixed with the nonpolar resin solution, rather than an anhydrous polar solvent. The result is that the low MW isoprene rubber does not come out of solution, but instead ends up in the resulting two-phase system.

In various embodiments, step 220 comprises mixing an aqueous polar solvent with the nonpolar resin solution in certain w/w ratios so as to promote a two-phase system that can be separated into liquid fractions. In various embodiments, the aqueous polar solvent mixture comprises from about 5-25 parts of water and 100 parts of a polar solvent based on weight. The extraction can be done multiple times to recover as much of the polar components as possible, without extracting undesired amounts low molecular weight rubber. Alternatively, the combined aqueous polar solvent extracts can be washed with a nonpolar solvent to remove any rubber and most of the terpenes and sesquiterpenes.

In step 230, the combined aqueous polar liquid fractions can be desolventized to recover a solid that is rich in argentatins, low in guayulin content, and not containing any rubber.

After the multiple extractions with the aqueous polar solvent mixture, a rubber rich solution in the nonpolar solvent will remain. The rubber solution can be purified with the addition of a polar solvent to remove the remaining non-rubber resin components. This results in a concentrated low MW rubber product with few impurities.

In step 240, the nonpolar liquid fraction is desolventized. This liquid fraction comprising natural rubber can be desolventized to a rubber mass, or used as is for other processes, such as isoprene latex production.

Countercurrent Liquid/Liquid Extraction

As per the automation of the method 100, the above step 220 can be fully automated by using a continuous liquid/liquid countercurrent extractor. The method 200, except for the initial resin dissolution step 210 and the two desolventization steps 230 and 240, can comprise an automated process by passing the nonpolar resin solution stream countercurrent to an aqueous polar solvent stream in a manner such that the aqueous product stream removes the argentatins from the nonpolar resin solution, leaving the nonpolar resin solution stream rich in guayulins. In automating the extraction of method 200, there is no precipitated rubber because the rubber remains in the nonpolar liquid fraction. Thus, for automating method 200, an extractor-centrifuge is not necessarily required, since there are no solid particles to separate out, but the centrifugation capabilities also aids separation of liquid phases.

In various embodiments, a constant aqueous polar solvent composition is used as the countercurrent stream against the nonpolar resin solution stream. This composition can be the combination of the water and the polar solvent from the method 200, and in some instances, at the same w/w ratio of water/polar solvent used in the illustrated method in FIG. 2.

So, for example, the countercurrent polar stream may comprise a mixture of 1:20 to about 1:2 water/polar solvent on a weight basis. In certain embodiments, the countercurrent polar stream may comprise a w/w ratio of water/polar solvent of 1:20 to about 1:5. In various embodiments, the two countercurrent running streams comprise the nonpolar resin solution stream and an aqueous methanol stream.

As the automated continuous liquid/liquid countercurrent extractor runs, the aqueous polar solvent stream becomes rich in argentatins whereas the nonpolar resin solution stream because rich in low MW isoprene rubber.

Figure 3:
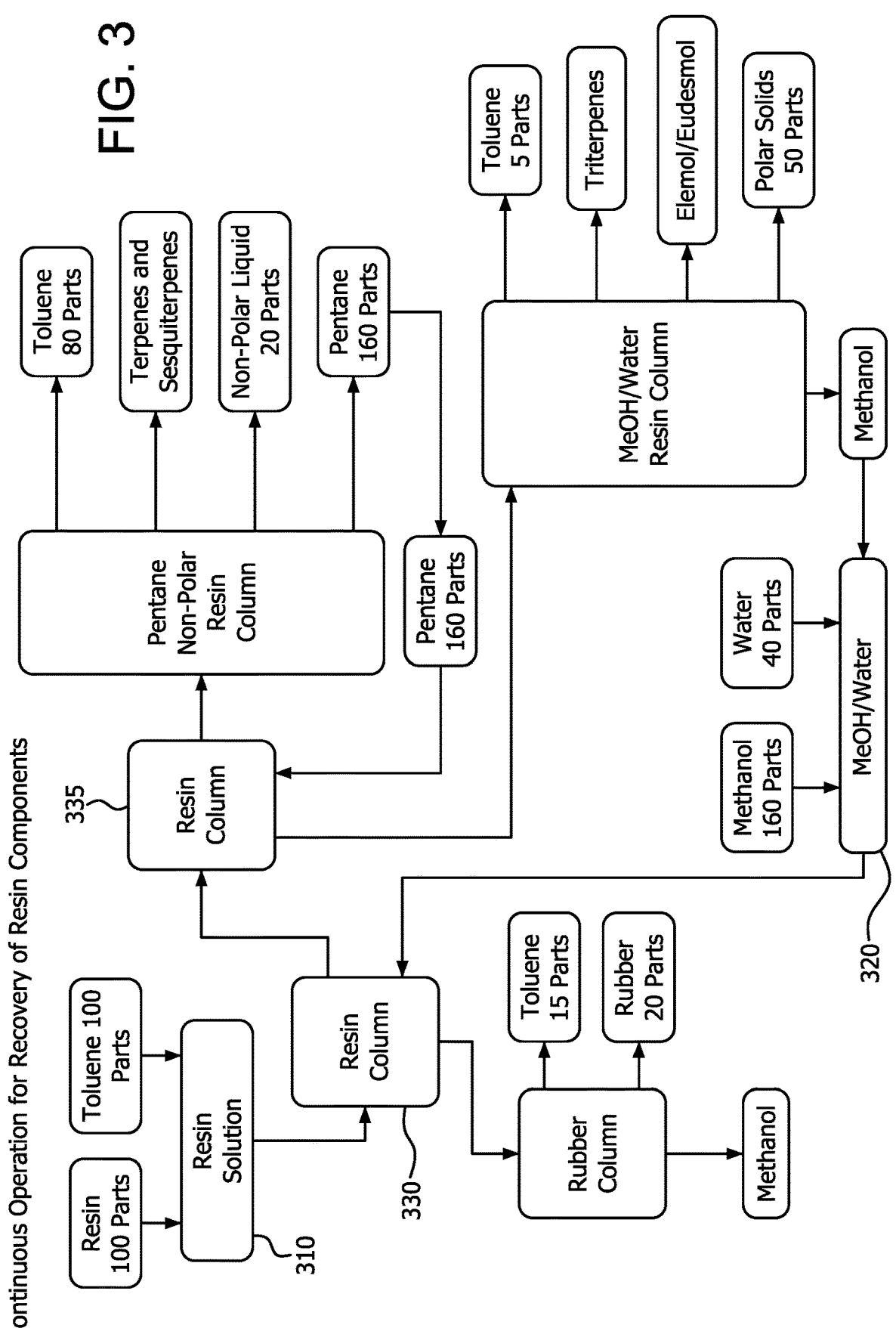
FIG. 3 illustrates a continuous operation for the recovery of guayule resin components.
Figure 4A:
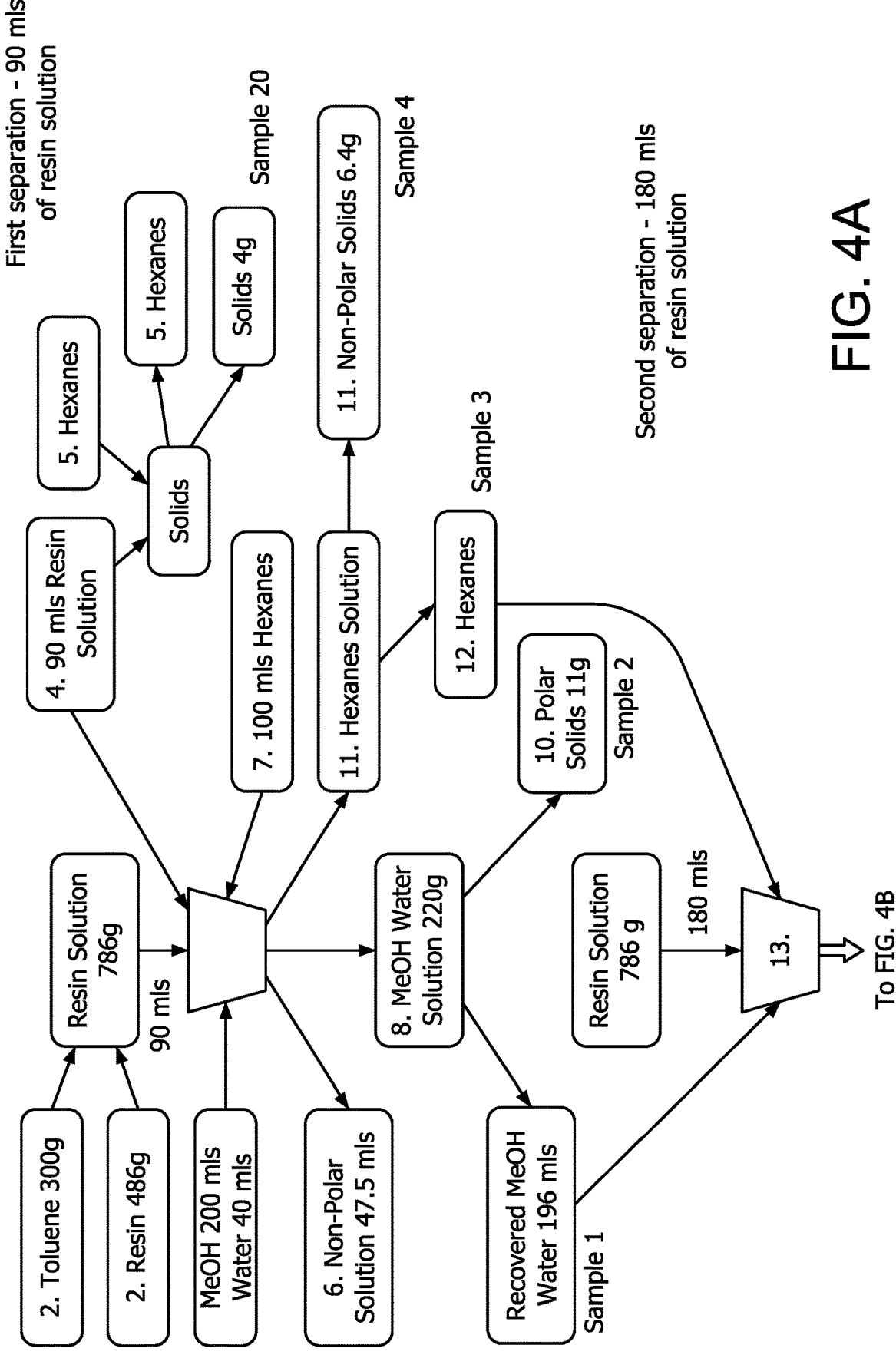
FIGS. 4A-4D illustrate a flowchart summary of the guayule resin extractions and solvent recovery manipulations exemplified in Example 2.
Figure 4B:
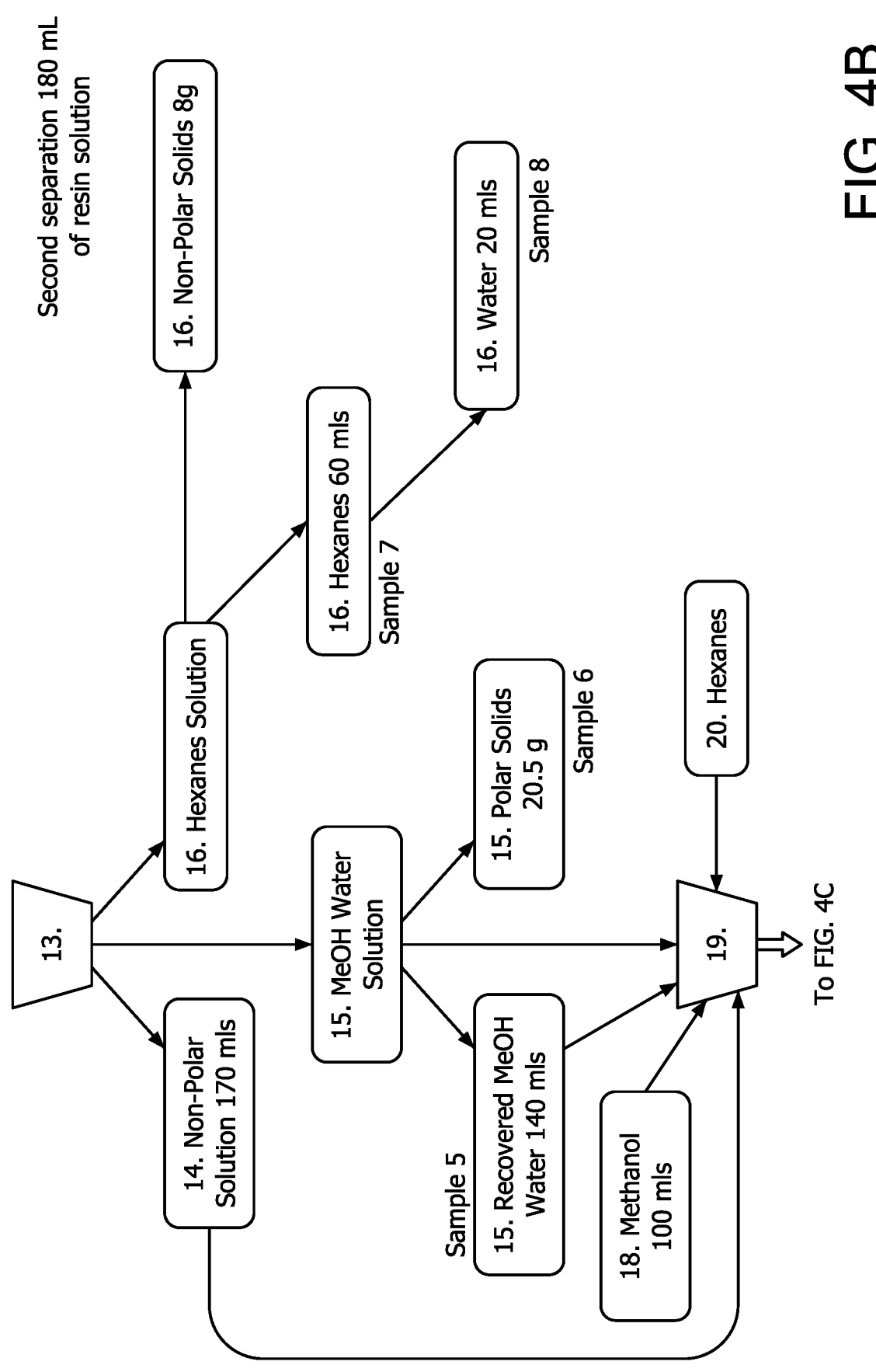
Figure 4C:
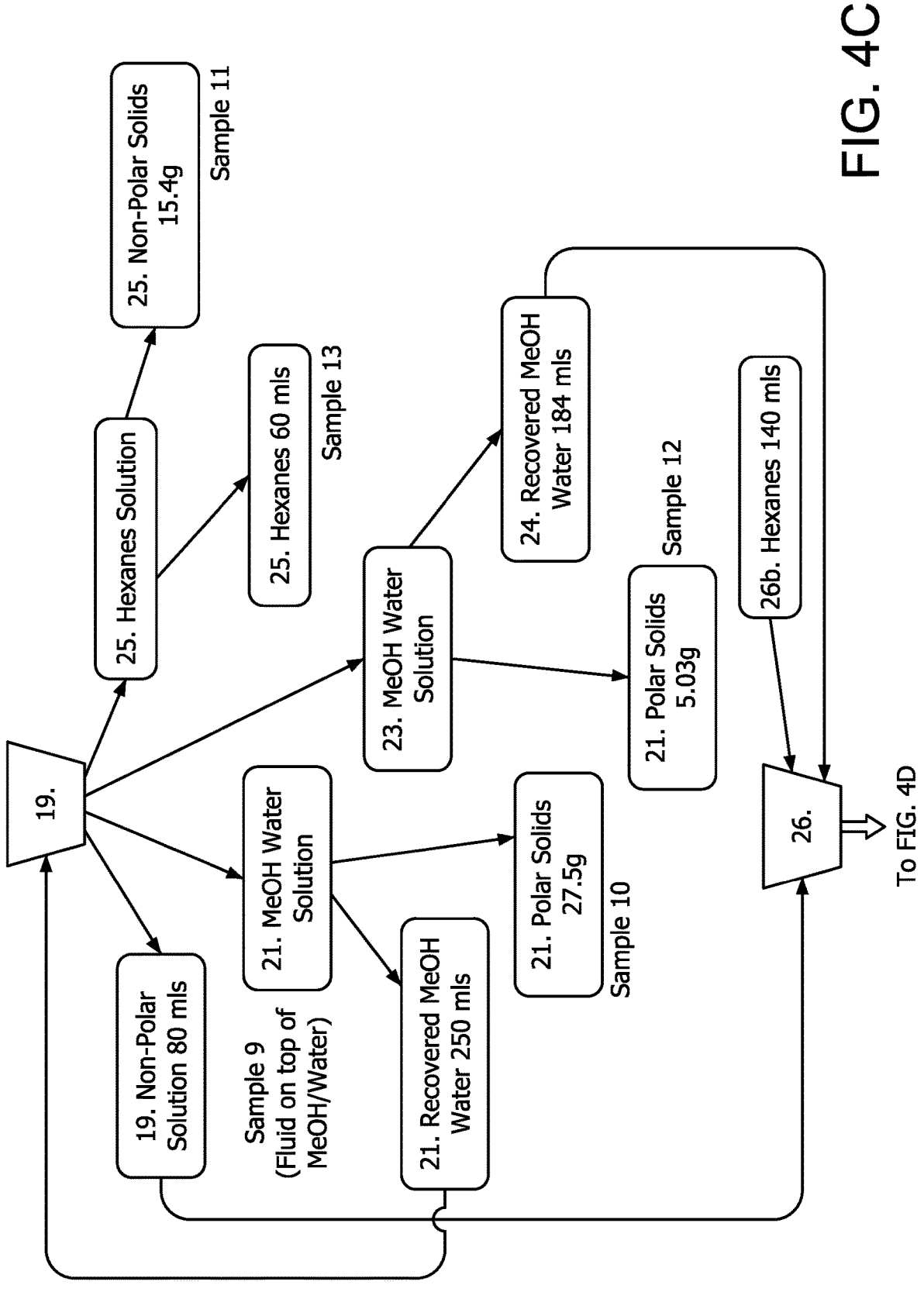
Figure 4D:
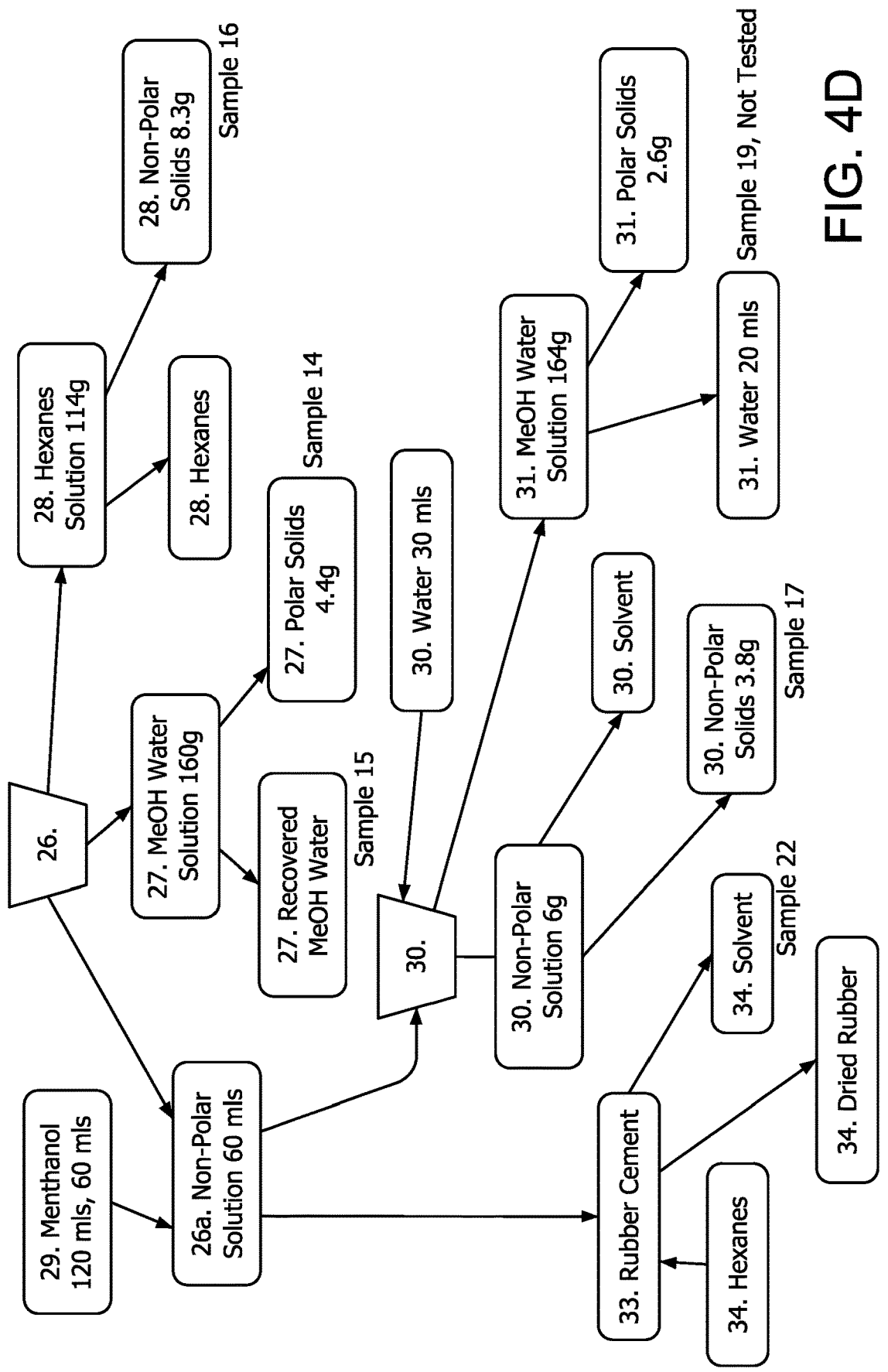

FIG. 3 illustrates an embodiment of a continuous operation that can be used for the recovery of resin components in guayule resin. In various aspects, the exemplary continuous operation depicted in FIG. 3 represents an automation of the method 200 illustrated in FIG. 2, (with the addition of pentane washings as per the hexanes used in Example 2 below). It is important to note the process depicted in FIG. 3 is only an example, and the relative amounts of materials (indicated as "parts") can be varied, and in some instances the output amounts (also indicated as "parts") may vary from this example.

The automated process in FIG. 3 begins, for example, with a resin solution 310 comprising a nonpolar solvent such as toluene and guayule resin. Methanol and water are mixed at 320 to form the aqueous polar solvent system that is mixed with the nonpolar system in the resin column at 330. The second location 335 is where the two-phase system is separated, the upper righthand portion of the flowchart showing the processes involving the nonpolar phase and the lower righthand portion of the flowchart showing the processes involving the aqueous polar phase. As illustrated, the nonpolar phase provides the terpenes and sesquiterpenes, whereas the aqueous polar phase, aside from providing argentatins, can also provide the monoterpene elemol and the monoterpenoid β-eudesmol.

EXAMPLES

Example 1

1. A nonpolar resin solution of guayule resin dissolved in a nonpolar solvent was prepared by adding about 100 mL toluene to about 55.8 grams of resin previously obtained from guayule processing. The beginning resin was a solid at room temperature, having a softening point around 50° C. The nonpolar resin solution was gravity or suction filtered through a Buchner funnel to remove the precipitated lignocellulosic materials. About 5 mL of the resulting filtrate was added to 35 mL methanol to coagulate the isoprene rubber in the solution. The coagulated rubber was collected and dried, and the methanol recovered and vacuum dried, resulting in 0.448 g isoprene rubber and 1.123 g resin. The filtered solids from the 55.8 grams of resin in toluene solution was dried and weighed, resulting in 1.95 g of solids, or 3.5% of the original resin weight.

2. 20 mL of the toluene filtrate as per step 1 was measured into each of four (4) centrifuge tubes. 25 mL of methanol was added to each tube. The tubes were agitated by hand, then centrifuged for 20 minutes at 8,000 rpm. The dark liquid layer from each tube was decanted and collected in new centrifuge tubes and processed in step 3 below. The rubber remaining in the tubes was rinsed with a first rinse of 20 mL of acetone, then with a second rinse of 20 mL acetone. The acetone aliquots were combined and desolventized to yield a total of 1.98 g of solids. The rubber was collected by redissolving in hexanes and collecting the solution in a pre-weighed pan to desolventize in a vacuum oven. The rinsed and desolventized rubber weighed 4.64 g or 14% of the resin processed.

3. The decanted solution from step 2 was processed by adding 2.5 mL of water to each tube (about 12.5 parts based on the methanol added of 25 mL or 19.8 g of methanol per centrifuge tube). The four tubes were centrifuged at 8,000 rpm for 20 minutes. A dark layer of about 7-10 mL volume was produced in each of the tubes. The dark layers were combined and desolventized in a vacuum oven. The resulting solids weighed 10.05 g or 30.3% of the resin.

4. The combined lighter layers from step 3 above were further processed by the addition of 2.5 mL water (about 12.5 parts water based on the methanol added). The tubes were agitated and centrifuged to yield another 7-10 mL volume of dark layer in each of the tubes. The dark layers were combined and dried in a vacuum oven to yield 9.94 g solids.

5. The lighter layers remaining from step 4 were combined and further processed by adding 5 mL of water and 5 mL hexanes to each tube. The tubes were agitated and centrifuged to produce a two-phase system with a nonpolar phase as the top layer. This layer was collected and desolventized in a vacuum oven to yield 3.36 g of solids.

6. The remaining polar layers from step 5 were combined and desolventized to yield about 2.12 g of solids.

Table 1 below summarizes the resin fractions obtained in Example 1, steps 1-6.

TABLE 1

Resin Fractions Obtained in Example 1, Steps 1-6

| Material/Process step | Weight | % Rubber |
|---|---|---|
| Rubber (step 1) | 0.448 | N/A |
| Resin (step 1) | 1.123 | N/A |
| Solids (step 1) | 1.95 | N/A |
| Rubber (step 2) | 4.46 | 95.9% |
| Resin (step 3) | 10.05 | 28.5% |
| Resin (step 4) | 9.94 | 0.0% |
| Resin (step 5) | 3.36 | 0.0% |
| Resin (step 6) | 2.12 | 0.0% |

Example 2

The steps used in Example 2 are also set forth schematically as a flowchart in FIGS. 4A, 4B, 4C and 4D. The sample numbers and the step numbers correlate between the written steps below and the flowchart illustrated. The illustrated method proceeds across the four drawing sheets. In the flowchart, trapezoidal symbols indicate liquid-liquid separations, (e.g., phase separation performed in a separatory funnel). The other separations involve use of a rotary evaporator ("rotovap") to remove solvents ("desolventize") from a solution to obtain recovered solvents and residual solids. Example 2, set forth below and illustrated in FIGS. 4A-4D, show recovery and reuse of solvents for additional extractions:

1. A sample of 486 grams pourable resin (the resin having some residual solvent present from a previous guayule process) was diluted with 300 grams toluene.

2. Simple mixing by hand sufficed to dissolve the resin and form a nonpolar resin solution.

3. Two 45 mL aliquots of the nonpolar resin solution were transferred to two centrifuge tubes that were spun to remove solids. 48.7 g resin was obtained.

4. Each of the two supernatant solutions were combined into 200 mL methanol and water in a separatory funnel.

5. The solids from the centrifuge tubes were rinsed twice with hexanes, and the solids collected as Sample #20.

6. The separatory funnel was left several days for the phases to separate. The nonpolar phase measuring 47.5 mL was separated.

7. 100 mL hexanes was added to the polar phase and allowed to settle.

8. The aqueous methanol phase was collected for concentration. Flask tare weight=174.69 g, with methanol/water=395.99 g, or about 220.3 g solution for concentration.

9. A rotary evaporator was used to concentrate/recover the solids/solvent.

10. Weight after concentrating was 185.72 g. The material was transferred to a sample vial Sample #2, collected sample of aqueous methanol recovered as Sample #1 for GC/FID. 196 mL aqueous methanol was recovered and returned to separator after removal of hexanes.

11. Hexanes collected into rotary evaporator having flask tare weight=203.47 g, and with hexanes 298.18 g. After concentration=209.86 g, which was transferred to vial as Sample #4.

12. Collected sample of recovered hexanes—Sample #3, and solution of residual hexane extract Sample #4 for GC/FID.

13. Subsequently, four (4) additional 45 mL aliquots of raw resin solution after centrifuging was added to recovered methanol/water in separatory funnel. There were essentially no solids. (97.94 g resin).

14. The nonpolar fraction was poured off into centrifuge tubes, recovering 170 mL of 180 mL. Then hexanes were added to the separatory funnel.

15. Recovered polar fraction transferred to the rotary evaporator, flask tare weight=175.04 g, and 195.56 g after rotary evaporator concentration. 140 mL methanol/water recovered (Sample #5). 20.5 g polar solids recovered (Sample #6).

16. The hexanes layer was run through the rotary evaporator: 204.06 g flash weight. Appeared to be about 8 g extract (not tested on GC).

17. Recovered 60 mL hexanes+20 mL water. Hexanes processed as Sample #7, water extracted with toluene (toluene Sample #8). (Note: the water phase is from polar concentration, collecting as a solid on the condenser).

18. Added methanol to recovered methanol/water from 140 mL to 240 mL back into the separatory funnel.

19. Re-extracted nonpolar 5 tubes from step 14 with methanol/water from step 18. Recovered 80 mL of nonpolar solution (from 170 mL added).

20. Added 120 mL hexanes to methanol/water.

21. The polar solution was transferred to flask 174.78 g with solution 449, after rotary evaporation 202.3 g (Sample #10). About 4 g remaining in flask was dissolved in 22 mL acetone and saved.

22. Collected 250 mL solvent, including 2 mL low density fluid (hexanes or toluene) samples low density fluid to Sample #9.

23. Transferred methanol/water phase to flask tare=174.79 g, with fluid 375.13 g, and after drying 179.80 g. Dried polar solids 5.03 g (Sample #12).

24. Collected 184 mL solvent.

25. Collected hexane layer from separatory funnel transferred to flask with tare=203.48 g; with fluid 307.91 g; dried 218.92 g. Black liquid collected as Sample #11; 15.4 g nonpolar solids recovered (Sample #13).

26. Polar methanol/water from Step 24 plus the nonpolar phase from Step 19 collected 60 mL nonpolar phase. 140 mL fresh hexanes added.

27. Collected methanol/water into separatory funnel, flask tare=174.77 g, with solvent 339.58 g, dried 179.19 g (dried Sample #14). Recovered methanol Sample #15.

28. Collected hexanes into separatory funnel, transferred to flask tare=203.51, total 317.50 g, concentrated 211.53 g, dried Sample #16—black liquid.

29. Remaining nonpolar solution (60 mL) split into centrifuge tubes to extract with methanol 2× volume. Then rinsed again with 1× volume methanol.

30. Methanol added to the separator funnel, the 30 mL water added. The black lower layer was removed to the rotary evaporator tare=203.5 g, total 209.55 g, concentrated 207.3 g (Sample #17).

31. Methanol layer collected and concentrated in rotary evaporator tare=174.8 g, total 338.7 g, dried 177.4 g (Sample #18), about 20 mL water removed as a liquid from sample before completing the drying. The water collected as Sample #19.

32. Recovered solvent methanol (Sample #20).

33. Rubber collected by dissolving rubber residue in hexanes, then rinsing tubes with more hexanes to collect all of the rubber into pan with tare weight 12.94 g, after air-dried vacuum oven dried 38.91 g (Sample #21).

34. Collected liquid from cold trap after vacuum oven (Sample #22).

Table 2 sets forth differential scanning calorimetry (DSC) data for the numbered samples identified in Example 2 and that are also shown in the flowchart of FIGS. 4A-4D. The sample numbers (1-21) appear in the far left column as hyphenated suffixes to the larger experiment number 20190812. The DSC instrument used was a TA Instruments Q2000 DSC, run from −120° C. to 200° C. at a rate of about 10° C./minute.

TABLE 2

| | | | DSC Data | | | |
|---|---|---|---|---|---|---|
| Differential Scanning Calorimetry Data (Example 2) | | | | | | |
| Sample ID | Tg | Tm1 | J/g | Tm2 | J/g | Tm3 |
| 20190812-1 | | | | | | |
| 20190812-2 | −36.63 | 64.16 | 41.67 | | | |
| 20190812-3 | | −22.83 | 2.798 | 78.88 | 173.4 | |
| 20190812-4 | | | | | | |
| 20190812-5 | −26.76 | 94.33* | 29.37 | | | |
| 20190812-6 | 11.16 | | | | | |
| 20190812-7 | | | | | | |
| 20190812-8 | | | | | | |
| 20190812-9 | | | | | | |
| 20190812-10 | 23.08 | | | | | |
| 20190812-11 | | | | | | |
| 20190812-12 | 22.47 | 86.73* | 7.11 | | | |
| 20190812-13 | | | | | | |
| 20190812-14 | | | | | | |
| 20190812-15 | 29.98 | | | | | |
| 20190812-16 | | 8.34 | 2.398 | 114.55 | 77.75 | |
| 20190812-17 | −45.22 | −13.64 | 8.206 | 39.55 | 1.323 | |
| 20190812-18 | 6.54 | 88.56 | | | | |
| 20190812-19 | | | | | | |
| 20190812-20 | | 66.39 | 41.51 | | | |
| 20190812-21 | | 30.58 | 1.571 | | | |

In Table 2, Tg refers to glass transition temperature. The glass transition temperature shows, for example, if there is polyisoprene in the sample (e.g., a Tg around −50° C. indicative of such). No measurable glass transition temperature indicates the isoprene rubber has been removed.

In Table 2, Tm is the melt temperature and J/g indicates the Joules/gram for the sample. Tm correlates with high melting point components, such as triglycerides near 50° C. or triterpenes (e.g., argentatins) at >70° C.

In Table 2, the Tm data entries for Sample ID 20190812-5 and 20190812-12 are asterisked to indicate that these samples show high concentrations of argentatins.

Table 3 sets forth fraction weights for the numbered samples in Example 2 and shown in the flowchart of FIGS. 4A-4D. The sample numbers are in the far left column as hyphenated suffixes to the larger experiment number 20190812. The data was obtained by an instrument capable of gas chromatography with flame-ionization detection (GC/FID).

TABLE 3

| | | | MW (typical) | | | |
|---|---|---|---|---|---|---|
| Fraction Weights (Example 2) | | | | | | |
| | 5802 | 1409 | 1098 | 632 | 509 Argentatins | 420 Guayulins |
| | | Triacylglycerides | | | | |
| Sample ID | Rub. Area | Peak 2 | Peak 3 | Peak 4 | Peak 5 | Peak 6 |
| 20190812-1 | | | | | | |
| 20190812-2 | 4.8% | 2.7% | 8.5% | | 77.1% | 6.8% |
| 20190812-3 | 0.8% | 2.9% | 12.9% | | 78.0% | 5.4% |
| 20190812-4 | | | | | | |
| 20190812-5 | | | | | | |
| 20190812-6 | 1.2% | 2.9% | 13.6% | | 75.9% | 6.5% |
| 20190812-7 | | | | | | |
| 20190812-8 | | | | | | |
| 20190812-9 | | | | | | |
| 20190812-10 | 3.3% | 6.0% | 13.9% | | 72.4% | 4.5% |
| 20190812-11 | 17.7% | 12.4% | 17.2% | | 46.4% | 6.3% |
| 20190812-12 | 1.9% | 4.4% | 11.4% | | 77.4% | 4.9% |
| 20190812-13 | | | | | | |
| 20190812-14 | 0.0% | 16.2% | 0.0% | | 83.8% | 0.0% |
| 20190812-15 | 3.4% | 5.0% | 12.7% | | 74.9% | 4.0% |
| 20190812-16 | 31.2% | 7.9% | 12.2% | | 42.3% | 6.3% |
| 20190812-17 | 19.3% | 18.2% | 22.2% | | 34.8% | 5.5% |
| 20190812-18 | 4.7% | 5.9% | 12.6% | | 67.8% | 9.0% |
| 20190812-19 | | | | | | |
| 20190812-20 | | | | | | |
| 20190812-21 | 71.7% | 8.9% | 9.5% | | 9.9% | 0.0% |

In Table 3, the abbreviations "Rub. Area," "Peak 2," "Peak 3," "Peak 4," "Peak 5," and "Peak 6," represent the low molecular weight (low MW) column GPC data (with area under the peak converted to weight percent). "Rub. Area" refers to low MW isoprene rubber, "Peak 2" and "Peak 3" are expected to be triacylglycerides, "Peak 5" is argentatins, and "Peak 6" is the guayulins. The numbers listed in the top row of Table 2 are the typical MW's measured for these peaks.

As shown in Table 3, most of the samples were high in argentatins. Samples 20190812-11, -16 and -17, and most particularly sample -21, exhibited significant isoprene rubber content. Samples 20190812-11 and -17 show higher triglyceride content.

Thus, it has been demonstrated that polarity-controlled extractions of guayule resin can be used to isolate isoprenic rubber, argentatins and guayulins from the resin.

Additional Aspects

In various embodiments, a method of extracting *Parthenium argentatum* resin constituents from *Parthenium argentatum* resin comprises:

(a) dissolving the *Parthenium argentatum* resin in at least one nonpolar solvent to obtain a nonpolar resin solution and a first precipitate;

(b) separating the first precipitate from the nonpolar resin solution;

(c) adding a polar solvent to the nonpolar resin solution to obtain a mixed polarity resin solution and a second precipitate;

(d) separating the second precipitate from the mixed polarity resin solution to obtain a mixed solvent filtrate;

(e) adding water to the mixed solvent filtrate to obtain a two-phase system comprising an aqueous polar liquid fraction and a nonpolar liquid fraction;

(f) separating the aqueous polar liquid fraction and the nonpolar liquid fraction;

(g) recovering a first solids mixture by desolventizing the polar liquid fraction; and (h) recovering a second solids mixture by desolventizing the nonpolar liquid fraction.

In various embodiments, the nonpolar solvent is selected from the group consisting of hexanes, pentanes, petroleum ether, toluene, cyclohexane and mixtures thereof. In various embodiments, the nonpolar solvent comprises toluene and the polar solvent comprises methanol.

In various embodiments of the above method, step (g) and/or step (h) may be optional, such as in instances where these product streams are not commercially viable or unwanted for any reason.

In various embodiments of the above method, the steps are fully automated by use of a continuous countercurrent liquid/liquid extractor, wherein the nonpolar resin solution flows as a nonpolar solution stream countercurrent to a polar solution stream comprising a mixture of water and the polar solvent, and wherein the nonpolar solution stream becomes progressively enriched in guayulins, the polar solution stream becomes progressively enriched in argentatins, and second precipitate is continuously removed by centrifugation.

In various embodiments, a method of extracting *Parthenium argentatum* resin constituents from *Parthenium argentatum* resin comprises:

(a) dissolving the *Parthenium argentatum* resin in at least one nonpolar solvent to obtain a nonpolar resin solution and a precipitate;

(b) separating the precipitate from the nonpolar resin solution;

(c) adding an aqueous polar solvent to the nonpolar resin solution to obtain a two-phase system comprising an aqueous polar liquid fraction and a nonpolar liquid fraction;

(d) separating the aqueous polar liquid fraction and the nonpolar liquid fraction;

(e) recovering a first solids mixture by desolventizing the polar liquid fraction; and (f) recovering a second solids mixture by desolventizing the nonpolar liquid fraction.

In various embodiments, the nonpolar solvent is selected from the group consisting of hexanes, pentanes, petroleum ether, toluene, cyclohexane and mixtures thereof. In various embodiments, the nonpolar solvent comprises toluene and the polar solvent comprises methanol.

In various embodiments, step (e) and/or step (f) may be optional, such as in instances where these product streams are not commercially viable or unwanted for any reason.

In various embodiments, the extraction steps are fully automated by use of a continuous countercurrent liquid/liquid extractor, wherein the nonpolar resin solution flows as a nonpolar solution stream countercurrent to a polar solution stream comprising a mixture of water and the polar solvent, and wherein the nonpolar solution stream becomes progressively enriched in low MW isoprene rubber and the polar solution stream becomes progressively enriched in argentatins.

In various embodiments, a method of separating lignocellulosic substances from *Parthenium argentatum* resin comprises:

(a) dissolving the *Parthenium argentatum* resin in at least one nonpolar solvent to form a nonpolar resin solution further comprising precipitated lignocellulosic substances;

(b) separating the precipitated lignocellulosic substances from the nonpolar resin solution; and (c) optionally washing the precipitated lignocellulosic substances with aliquots of the nonpolar solvent.

In various embodiments, the nonpolar solvent is selected from the group consisting of hexanes, pentanes, petroleum ether, toluene, cyclohexane and mixtures thereof.

In various embodiments, a method of separating low MW isoprene rubber from *Parthenium argentatum* resin comprises:

(a) dissolving the *Parthenium argentatum* resin in a nonpolar solvent to form a nonpolar resin solution further comprising a first precipitate;

(b) separating the first precipitate from the nonpolar rein solution;

(c) adding a polar solvent to the nonpolar resin solution to precipitate the low MW natural polyisoprene rubber in the form of coagulated particles; and (d) recovering the precipitated low MW natural polyisoprene rubber from the nonpolar resin solution.

In various embodiments, the nonpolar solvent is selected from the group consisting of hexanes, pentanes, petroleum ether, toluene, cyclohexane and mixtures thereof. In various embodiments, the nonpolar solvent comprises toluene and the polar solvent comprises methanol.

In various embodiments, a method of separating a mixture of triterpenes from *Parthenium argentatum* resin comprises:

(a) dissolving the *Parthenium argentatum* resin in at least one nonpolar solvent to form a nonpolar resin solution further comprising a first precipitate;

(b) separating the first precipitate from the nonpolar resin solution;

(c) adding a polar solvent to the nonpolar resin solution to form a mixed polarity resin solution further comprising a second precipitate;

(d) separating the second precipitate from the mixed polarity resin solution;

(e) adding water to the mixed polarity resin solution to form separable aqueous polar and nonpolar liquid fractions;

(f) separating the aqueous polar liquid fraction from the nonpolar liquid fraction; and (g) recovering the mixture of triterpenes by desolventizing the aqueous polar liquid fraction.

In various embodiments, the nonpolar solvent is selected from the group consisting of hexanes, pentanes, petroleum ether, toluene, cyclohexane and mixtures thereof. In various embodiments, the nonpolar solvent comprises toluene and the polar solvent comprises methanol.

In various embodiments, a method of isolating a mixture comprising terpenes and sesquiterpenes from *Parthenium argentatum* resin comprises:

(a) dissolving the *Parthenium argentatum* resin in at least one nonpolar solvent to form a nonpolar resin solution further comprising a first precipitate;

(b) separating the first precipitate from the nonpolar resin solution;

(c) adding a polar solvent to the nonpolar resin solution to provide a mixed polarity resin solution further comprising a second precipitate;

(d) separating the second precipitate from the mixed polarity resin solution;

(e) adding water to the mixed polarity resin solution to form separable aqueous polar and nonpolar liquid fractions;

(f) separating the nonpolar liquid fraction from the aqueous polar liquid fraction; and (g) recovering the mixture comprising terpenes and sesquiterpenes by evaporating the nonpolar liquid fraction.

In various embodiments, the nonpolar solvent is selected from the group consisting of hexanes, pentanes, petroleum ether, toluene, cyclohexane and mixtures thereof. In various embodiments, the nonpolar solvent comprises toluene and the polar solvent comprises methanol.

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g., integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

The invention claimed is:

1. A method of extracting *Parthenium argentatum* resin constituents from *Parthenium argentatum* resin, the method comprising:

(a) dissolving the *Parthenium argentatum* resin in a nonpolar solvent to obtain a nonpolar resin solution and a first precipitate;

(b) separating the first precipitate from the nonpolar resin solution;

(c) adding a polar solvent to the nonpolar resin solution to obtain a mixed polarity resin solution and a second precipitate;

(d) separating the second precipitate from the mixed polarity resin solution to obtain a mixed solvent filtrate;

(e) adding water to the mixed solvent filtrate to obtain a two-phase system comprising an aqueous polar liquid fraction and a nonpolar liquid fraction;

(f) separating the aqueous polar liquid fraction and the nonpolar liquid fraction;

(g) recovering a first solids mixture by desolventizing the polar liquid fraction;

(h) recovering a second solids mixture by desolventizing the nonpolar liquid fraction; and performing continuous countercurrent extraction, wherein the nonpolar resin solution flows as a nonpolar solution stream countercurrent to a polar solution stream comprising a mixture of water and the polar solvent, and wherein the nonpolar solution stream becomes progressively enriched in guayulins, the polar solution stream becomes progressively enriched in argentatins, and the second precipitate is continuously removed by centrifugation.

2. The method of claim 1, wherein the nonpolar solvent is selected from the group consisting of hexanes, pentanes, petroleum ether, toluene, cyclohexane, and mixtures thereof.

3. The method of claim 1, wherein the nonpolar solvent is at least one of toluene and cyclohexane.

4. The method of claim 1, wherein the polar solvent is selected from the group consisting of methanol, ethanol, isopropanol, acetone, and mixtures thereof.

5. The method of claim 1, wherein the first precipitate comprises lignocellulosic substances and the second precipitate comprises coagulated isoprene rubber particles.

6. The method of claim 1, wherein the first solids mixture comprises argentatins.

7. The method of claim 1, wherein the second solids mixture comprises guayulins.

8. The method of claim 1, wherein the step of dissolving the *Parthenium argentatum* resin in a nonpolar solvent comprises combining a w/w ratio of *Parthenium argentatum* resin to nonpolar solvent of from about 1:1 to about 1:2.

9. The method of claim 1, wherein the step of dissolving the *Parthenium argentatum* resin in a nonpolar solvent further comprises heating up to a temperature below the boiling point of the nonpolar solvent to accelerate dissolution.

10. The method of claim 1, wherein the step of adding the polar solvent to the nonpolar resin solution comprises mixing a w/w ratio of the polar solvent to the nonpolar resin solution of from about 0.5:1 to about 2:1.

11. A method of extracting *Parthenium argentatum* resin constituents from *Parthenium argentatum* resin, the method comprising:

(a) dissolving the *Parthenium argentatum* resin in a nonpolar solvent to obtain a nonpolar resin solution and a precipitate;

(b) separating the precipitate from the nonpolar resin solution;

(c) adding water or an aqueous polar solvent to the nonpolar resin solution to obtain a two-phase system comprising an aqueous polar liquid fraction and a nonpolar liquid fraction;

(d) separating the aqueous polar liquid fraction and the nonpolar liquid fraction;

(e) recovering a first solids mixture by desolventizing the polar liquid fraction;

(f) recovering a second solids mixture by desolventizing the nonpolar liquid fraction; and performing continuous countercurrent extraction, wherein the nonpolar resin solution flows as a nonpolar solution stream countercurrent to a polar solution stream comprising a mixture of water and the polar solvent, and wherein the nonpolar solution stream becomes progressively enriched in natural polyisoprene rubber and the polar solution stream becomes progressively enriched in argentatins.

12. The method of claim 11, wherein the nonpolar solvent is selected from the group consisting of hexanes, pentanes, petroleum ether, toluene, cyclohexane, and mixtures thereof.

13. The method of claim 11, wherein the nonpolar solvent comprises at least one of toluene and cyclohexane.

14. The method of claim 11, wherein the aqueous polar solvent comprises a mixture of water and a polar solvent selected from the group consisting of methanol, ethanol, isopropanol, acetone, and mixtures thereof.

15. The method of claims claim 11, wherein the precipitate comprises lignocellulosic substances in a form of solid particles.

16. The method of claims claim 11, wherein the first solids mixture comprises argentatins.

17. The method of claims claim 11, wherein the second solids mixture comprises low MW isoprene rubber.

18. The method of claim 11, further comprising: separating lignocellulosic substances from the *Parthenium argentatum* resin, by the steps comprising:

dissolving the *Parthenium argentatum* resin in at least one nonpolar solvent to form a nonpolar resin solution further comprising precipitated lignocellulosic substances;

separating the precipitated lignocellulosic substances from the nonpolar resin solution; and optionally washing the precipitated lignocellulosic substances with aliquots of the nonpolar solvent.

19. The method of claim 18, wherein the nonpolar solvent is selected from the group consisting of hexanes, pentanes, petroleum ether, toluene, cyclohexane and mixtures thereof.

20. A method of separating natural polyisoprene rubber from *Parthenium argentatum* resin, the method comprising:

(a) dissolving the *Parthenium argentatum* resin in a nonpolar solvent to form a nonpolar resin solution further comprising a first precipitate;

(b) separating the first precipitate from the nonpolar resin solution;

(c) adding a polar solvent to the nonpolar resin solution to precipitate the natural polyisoprene rubber in the form of coagulated particles; and (d) recovering the precipitated natural polyisoprene rubber from the nonpolar resin solution; and performing continuous countercurrent extraction, wherein the nonpolar resin solution flows as a nonpolar solution stream countercurrent to a polar solution stream comprising a mixture of water and the polar solvent, and wherein the nonpolar solution stream becomes progressively enriched in natural polyisoprene rubber and the polar solution stream becomes progressively enriched in argentatins.

21. The method of claim 20, wherein the nonpolar solvent is selected from the group consisting of hexanes, pentanes, petroleum ether, toluene, cyclohexane, and mixtures thereof.

22. The method of claim 20, wherein the polar solvent is selected from the group consisting of methanol, ethanol, isopropanol, acetone, and mixtures thereof.

23. A method of separating a mixture of triterpenes from *Parthenium argentatum* resin, the method comprising:

(a) dissolving the *Parthenium argentatum* resin in a nonpolar solvent to form a nonpolar resin solution further comprising a first precipitate;

(b) separating the first precipitate from the nonpolar resin solution;

(c) adding a polar solvent to the nonpolar resin solution to form a mixed polarity resin solution further comprising a second precipitate;

(d) separating the second precipitate from the mixed polarity resin solution;

(e) adding water to the mixed polarity resin solution to form separable aqueous polar and nonpolar liquid fractions;

(f) separating the aqueous polar liquid fraction from the nonpolar liquid fraction; and (g) recovering the mixture of triterpenes by desolventizing the aqueous polar liquid fraction.

24. The method of claim 23, wherein the nonpolar solvent is selected from the group consisting of hexanes, pentanes, petroleum ether, toluene, cyclohexane, and mixtures thereof.

25. The method of claim 23, wherein the polar solvent is selected from the group consisting of methanol, ethanol, isopropanol, acetone, and mixtures thereof.

26. A method of isolating a mixture of terpenes and sesquiterpenes from *Parthenium argentatum* resin, the method comprising:

(a) dissolving the *Parthenium argentatum* resin in a nonpolar solvent to form a nonpolar resin solution further comprising a first precipitate;

(b) separating the first precipitate from the nonpolar resin solution;

(c) adding a polar solvent to the nonpolar resin solution to provide a mixed polarity resin solution further comprising a second precipitate;

(d) separating the second precipitate from the mixed polarity resin solution;

(e) adding water to the mixed polarity resin solution to form separable aqueous polar and nonpolar liquid fractions;

(f) separating the nonpolar liquid fraction from the aqueous polar liquid fraction; and (g) recovering the mixture comprising terpenes and sesquiterpenes by evaporating the nonpolar liquid fraction.

27. The method of claim 26, wherein the nonpolar solvent is selected from the group consisting of hexanes, pentanes, petroleum ether, toluene, cyclohexane, and mixtures thereof.

28. The method of claim 26, wherein the polar solvent is selected from the group consisting of methanol, ethanol, isopropanol, acetone, and mixtures thereof.

29. A method of separating natural polyisoprene rubber from *Parthenium argentatum* resin, the method comprising:

(a) dissolving the *Parthenium argentatum* resin in a nonpolar solvent to form a nonpolar resin solution further comprising a first precipitate;

(b) separating the first precipitate from the nonpolar resin solution;

(c) adding a polar solvent to the nonpolar resin solution to precipitate the natural polyisoprene rubber in the form of coagulated particles; and (d) recovering the precipitated natural polyisoprene rubber from the nonpolar resin solution; and performing continuous countercurrent extraction, wherein the nonpolar resin solution flows as a nonpolar solution stream countercurrent to a polar solution stream comprising a mixture of water and the polar solvent, and wherein the nonpolar solution stream becomes progressively enriched in natural polyisoprene rubber and the polar solution stream becomes progressively enriched in argentatins.

30. The method of claim 29, wherein the nonpolar solution stream also becomes progressively enriched in natural polyisoprene rubber.

* * * * *